(12) United States Patent
Wei et al.

(10) Patent No.: US 10,520,991 B2
(45) Date of Patent: Dec. 31, 2019

(54) ELECTRONIC DEVICE

(71) Applicants: Jen-Ting Wei, Taipei (TW);
Chen-Cheng Wang, Taipei (TW);
Chun-Chieh Chen, Taipei (TW);
Yuan-Xing Tsai, Taipei (TW)

(72) Inventors: Jen-Ting Wei, Taipei (TW);
Chen-Cheng Wang, Taipei (TW);
Chun-Chieh Chen, Taipei (TW);
Yuan-Xing Tsai, Taipei (TW)

(73) Assignee: COMPAL ELECTRONICS, INC.,
Taipei (TW)

( * ) Notice: Subject to any disclaimer, the term of this patent is extended or adjusted under 35 U.S.C. 154(b) by 0 days.

(21) Appl. No.: 16/371,089

(22) Filed: Mar. 31, 2019

(65) Prior Publication Data

US 2019/0310690 A1  Oct. 10, 2019

Related U.S. Application Data

(60) Provisional application No. 62/655,239, filed on Apr. 10, 2018.

(51) Int. Cl.
*G06F 1/16* (2006.01)

(52) U.S. Cl.
CPC .......... *G06F 1/1681* (2013.01); *G06F 1/1618* (2013.01); *G06F 1/1632* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,950,089 B1* | 9/2005 | Jaeger | ................ | G06F 3/03545 345/108 |
| 8,223,477 B2* | 7/2012 | Shi | ...................... | H04M 1/0239 345/168 |
| 9,063,698 B2* | 6/2015 | Chang | ................... | G06F 1/1637 |
| 10,078,351 B1* | 9/2018 | Chang | ................... | G06F 1/1667 |
| 10,372,171 B2* | 8/2019 | Lee | ........................ | G06F 1/1632 |
| 2014/0192471 A1* | 7/2014 | Chang | ................... | G06F 1/1633 361/679.26 |
| 2016/0018855 A1* | 1/2016 | Liao | ...................... | G06F 1/1616 361/679.56 |
| 2018/0203484 A1* | 7/2018 | Lee | ....................... | G06F 1/1669 |

* cited by examiner

*Primary Examiner* — Lisa Lea-Edmonds
(74) *Attorney, Agent, or Firm* — JCIPRNET

(57) ABSTRACT

An electronic device includes a body, a driven component, a first magnetic component and a second magnetic component. The driven component is slidably disposed in the body. The first magnetic component is disposed at the driven component. The second magnetic component is located at one side of the driven component, and the first magnetic component and the second magnetic component are disposed corresponding to each other. The second magnetic component is configured to generate a magnetic attraction force or a magnetic repulsion force to the first magnetic component, so as to position the driven component based on the magnetic attraction force or the magnetic repulsion force between the first magnetic component and the second magnetic component.

20 Claims, 14 Drawing Sheets

ELECTRONIC DEVICE

CROSS REFERENCE TO RELATED APPLICATION

This application claims the priority benefit of U.S. provisional application Ser. No. 62/655,239, filed on Apr. 10, 2018. The entirety of the above-mentioned patent application is hereby incorporated by reference herein and made a part of specification.

BACKGROUND

Field of the Disclosure

The disclosure relates to an electronic device and more particularly, to an electronic device with high product identification.

Description of Related Art

Portable electronic devices have become one of the indispensable tools for modern people due to convenient portability and capability of instantly transceiving or processing information. Commonly available portable electronic devices include smart cell phones, tablet computers or notebook computers, and most of these portable electronic devices have branded logos printed thereon for consumers' intuitive identification. However, most of the logos are designed in a unidirectional and forward manner. Taking the text corresponding to a brand name as an example, consumers can view a forward text only in a specific direction, but view reverse text in other directions, which is unfavorable for consumers' identification.

SUMMARY

The disclosure provides an electronic device capable of being not only flexibly changed but also improved in production identification.

An electronic device of the disclosure includes a body, a driven component, a first magnetic component and a second magnetic component. The driven component is slidably disposed in the body. The first magnetic component is disposed at the driven component. The second magnetic component is located at one side of the driven component, and the first magnetic component and the second magnetic component are disposed corresponding to each other. The second magnetic component is configured to generate a magnetic attraction force or a magnetic repulsion force to the first magnetic component, so as to position the driven component based on the magnetic attraction force or the magnetic repulsion force between the first magnetic component and the second magnetic component.

In an embodiment of the disclosure, the body is rotatably connected to the second magnetic component, and the second magnetic component includes a first magnetic portion and a second magnetic portion which are different from each other in magnetism. Along with relative rotation of the body and the second magnetic component, and the first magnetic component is aligned to the first magnetic portion or the second magnetic portion.

In an embodiment of the disclosure, the magnetism of one of the first magnetic portion and the second magnetic portion is different from magnetism of the first magnetic component, and the magnetism of the other one of the first magnetic portion and the second magnetic portion is the same as the magnetism of the first magnetic component.

In an embodiment of the disclosure, the electronic device further includes a third magnetic component and a fourth magnetic component. The third magnetic component is disposed at the driven component, wherein the first magnetic component and the third magnetic component are respectively located at two opposite sides of the driven component, and the first magnetic component is located between the second magnetic component and the third magnetic component. The body is rotatably connected to the fourth magnetic component, wherein the third magnetic component and the fourth magnetic component are disposed corresponding to each other, and the third magnetic component is located between the first magnetic component and the fourth magnetic component. The fourth magnetic component is configured to generate a magnetic attraction force or a magnetic repulsion force to the third magnetic component, so as to position the driven component based on the magnetic attraction force or the magnetic repulsion force between the third magnetic component and the fourth magnetic component. When the second magnetic component generates the magnetic attraction force to the first magnetic component, the fourth magnetic component generates the magnetic repulsion force to the third magnetic component. When the second magnetic component generates the magnetic repulsion force to the first magnetic component, the fourth magnetic component generates the magnetic attraction force to the third magnetic component.

In an embodiment of the disclosure, the fourth magnetic component comprises a third magnetic portion and a fourth magnetic portion which are different from each other in magnetism, and along with relative rotation of the body and the fourth magnetic component, the third magnetic component is aligned to the third magnetic portion or the fourth magnetic portion.

In an embodiment of the disclosure, the magnetism of one of the third magnetic portion and the fourth magnetic portion is different from magnetism of the third magnetic component, and the magnetism of the other one of the third magnetic portion and the fourth magnetic portion is the same as the magnetism of the third magnetic component.

In an embodiment of the disclosure, the first magnetic portion and the third magnetic portion are aligned to each other, and the second magnetic portion and the fourth magnetic portion are aligned to each other.

In an embodiment of the disclosure, the electronic device further includes a light source disposed in the body, wherein the driven component has a first hollow portion and a second hollow portion arranged side by side, and along with the driven component being slid relative to the body, any one of the first hollow portion and the second hollow portion is aligned to the light source.

In an embodiment of the disclosure, the second magnetic component is disposed in the body and generates the magnetic attraction force to the first magnetic component. The electronic device further includes a third magnetic component, a conductive sheet and an electromagnetic component. The third magnetic component is disposed at the driven component, wherein the first magnetic component and the third magnetic component are respectively located at two opposite sides of the driven component, and the first magnetic component is located between the second magnetic component and the third magnetic component. The electromagnetic component is disposed in the body, and the body and the electromagnetic component are rotatably connected to the conductive sheet. The third magnetic component and the electromagnetic component are disposed corresponding to each other, and the electromagnetic component is located between the third magnetic component and the conductive sheet. The conductive sheet is configured to be conducted with the electromagnetic component to induce the electromagnetic component to generate a magnetic attraction force to the third magnetic component, so as to get over and suppress the magnetic attraction force generated to the first magnetic component by the second magnetic component based on the magnetic attraction force between the third magnetic component and the electromagnetic component.

In an embodiment of the disclosure, the body has an opening region for exposing a part of the driven component.

An electronic device of the disclosure includes a first body, a second body, a first connection component, a driven component, a first magnetic component and a second magnetic component. The first body and the second body are respectively pivoted to the first connection component. The driven component is slidably disposed in the first body. The first magnetic component is disposed at the driven component. The second magnetic component is disposed corresponding to the first connection component, wherein the second magnetic component is located at one side of the driven component, and the first magnetic component and the second magnetic component are disposed corresponding to each other. The second magnetic component is configured to generate a magnetic attraction force or a magnetic repulsion force to the first magnetic component, so as to position the driven component based on the magnetic attraction force or the magnetic repulsion force between the first magnetic component and the second magnetic component.

In an embodiment of the disclosure, the second magnetic component is fixed in the first connection component, and the first body is rotatably connected to the second magnetic component. The second magnetic component includes a first magnetic portion and a second magnetic portion which are different from each other in magnetism. Along with relative rotation of the first body and the second magnetic component, the first magnetic component is aligned to the first magnetic portion or the second magnetic portion.

In an embodiment of the disclosure, the electronic device further includes a second connection component, a third magnetic component and a fourth magnetic component. The second connection component is arranged side by side with the first connection component, wherein the first body and the second body are respectively pivoted to the second connection component, and the driven component is located between the first connection component and the second connection component. The third magnetic component is disposed at the driven component, wherein the first magnetic component and the third magnetic component are respectively located at the two opposite sides of the driven component, and the first magnetic component is located between the second magnetic component and the third magnetic component. The fourth magnetic component is fixed in the second connection component, wherein the first body is rotatably connected to the fourth magnetic component, and the third magnetic component and the fourth magnetic component are disposed corresponding to each other. The third magnetic component is located between the first magnetic component and the fourth magnetic component, and the fourth magnetic component is configured to generate a magnetic attraction force or a magnetic repulsion force to the third magnetic component, so as to position the driven component based on the magnetic attraction force or the magnetic repulsion force between the third magnetic component and the fourth magnetic component. When the second magnetic component generates the magnetic attraction force to the first magnetic component, the fourth magnetic component generates the magnetic repulsion force to the third magnetic component. When the second magnetic component generates the magnetic repulsion force to the first magnetic component, the fourth magnetic component generates the magnetic attraction force to the third magnetic component.

In an embodiment of the disclosure, the second magnetic component is disposed in the first body and generates the magnetic attraction force to the first magnetic component. The electronic device further includes a second connection component, a third magnetic component, a conductive sheet and an electromagnetic component. The second connection component is arranged side by side with the first connection component, wherein the first body and the second body are respectively pivoted to the second connection component, and the driven component is located between the first connection component and the second connection component. The third magnetic component is disposed at the driven component, wherein the first magnetic component and the third magnetic component are respectively located at two opposite sides of the driven component, and the first magnetic component is located between the second magnetic component and the third magnetic component. The conductive sheet is fixed in the second connection component. The electromagnetic component is disposed in the first body, and the body and the electromagnetic component are rotatably connected to the conductive sheet. The third magnetic component and the electromagnetic component are disposed corresponding to each other, and the electromagnetic component is located between the third magnetic component and the conductive sheet. The conductive sheet is configured to be conducted with the electromagnetic component to induce the electromagnetic component to generate a magnetic attraction force to the third magnetic component, so as to get over and suppress the magnetic attraction force generated to the first magnetic component by the second magnetic component based on the magnetic attraction force between the third magnetic component and the electromagnetic component.

Based on the above, the electronic device of the disclosure can determine the position at which the driven component is located through a magnetic attraction effect or a magnetic repulsion effect. For example, the driven component can be designed with a specific pattern or text, and along with the change in the position of the driven component, a viewer can have different visual experiences. Thus, the electronic device of the disclosure can be not only flexibly changed but also improved in product identification.

In order to make the aforementioned and other features and advantages of the disclosure more comprehensible, several embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1A:
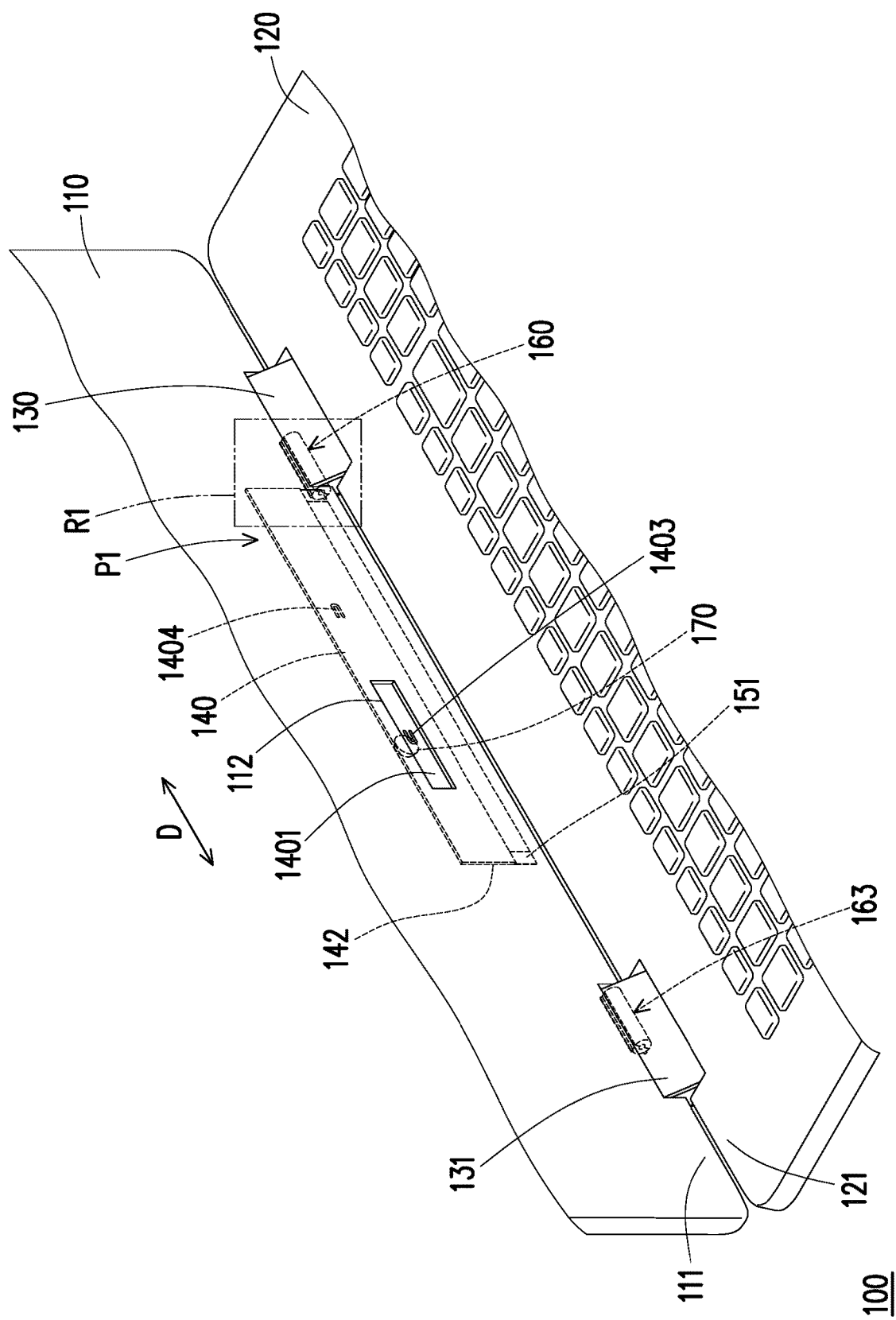
FIG. 1A is a schematic partial diagram illustrating an electronic device according to an embodiment of the disclosure.
Figure 1B:
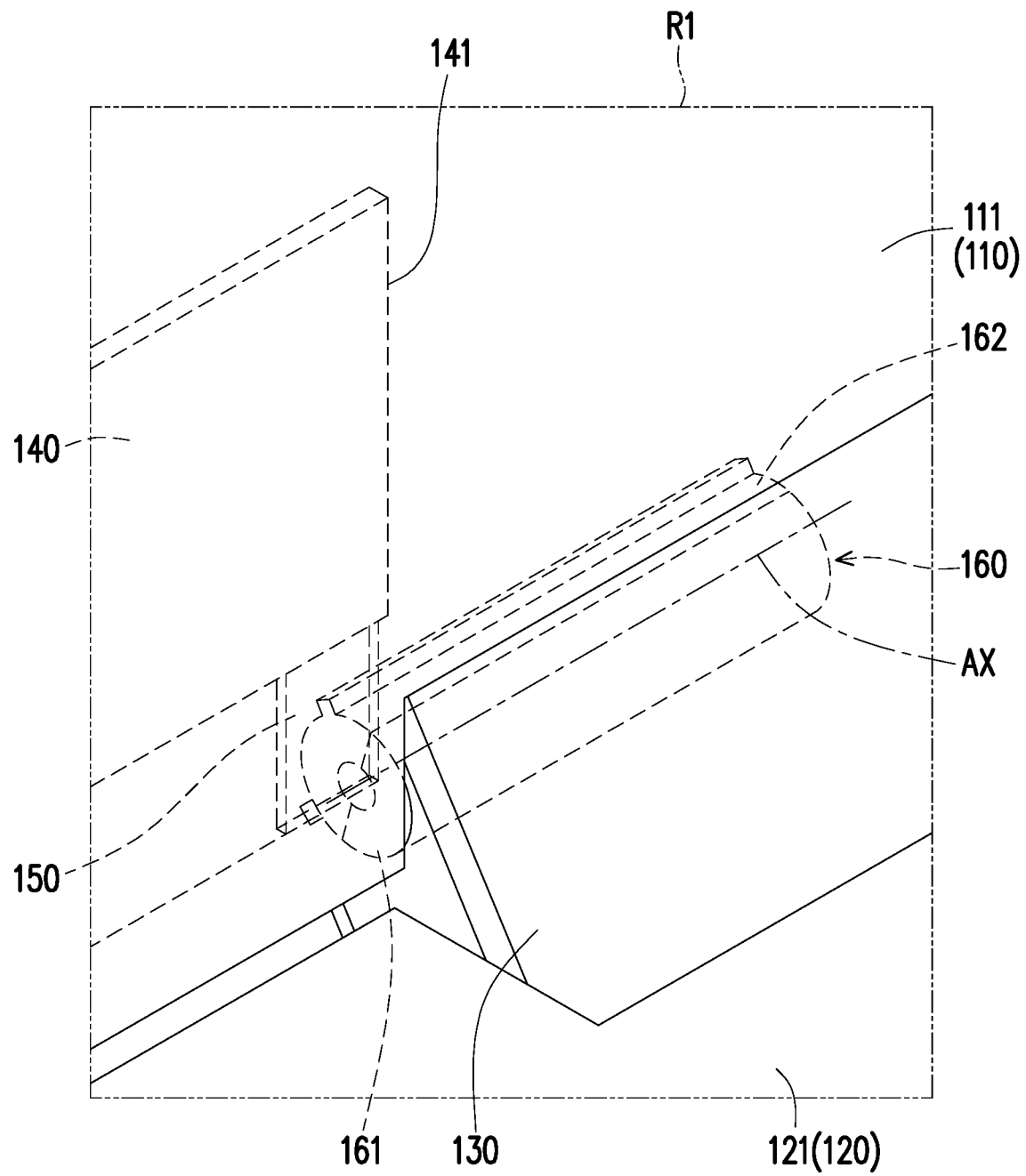
FIG. 1B is a schematic enlarged diagram illustrating a region R1 depicted in FIG. 1A.
Figure 1C:
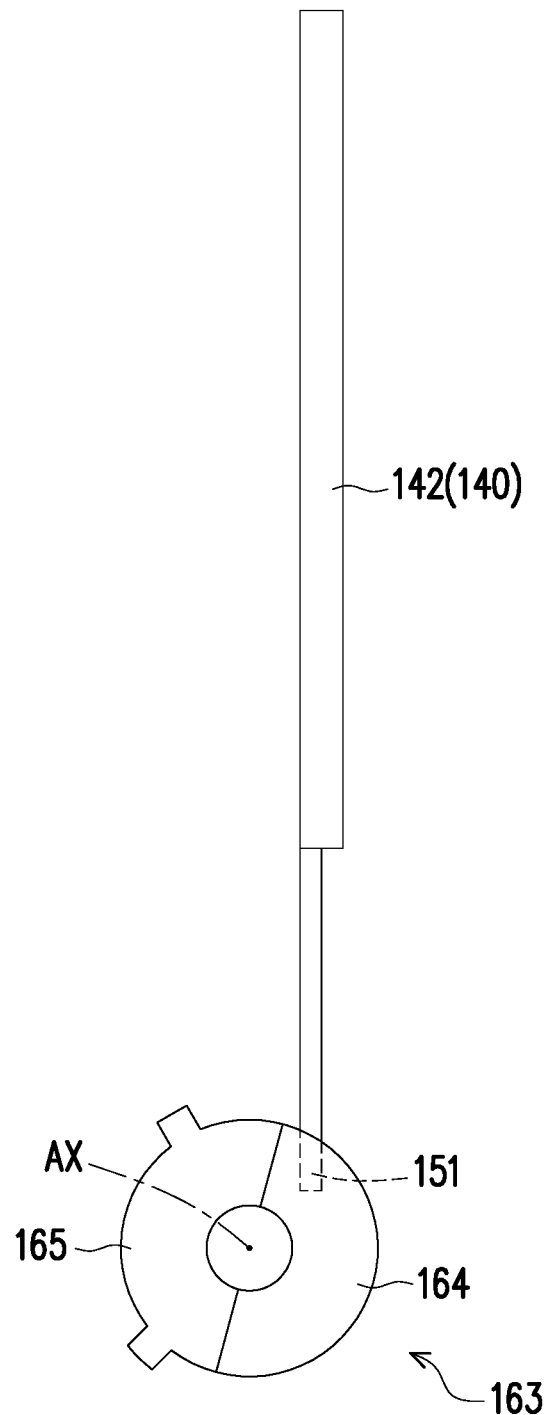
FIG. 1C is a schematic enlarged diagram illustrating the left side of a driven component, a third magnetic component and a fourth magnetic component depicted in FIG. 1A.
Figure 2A:
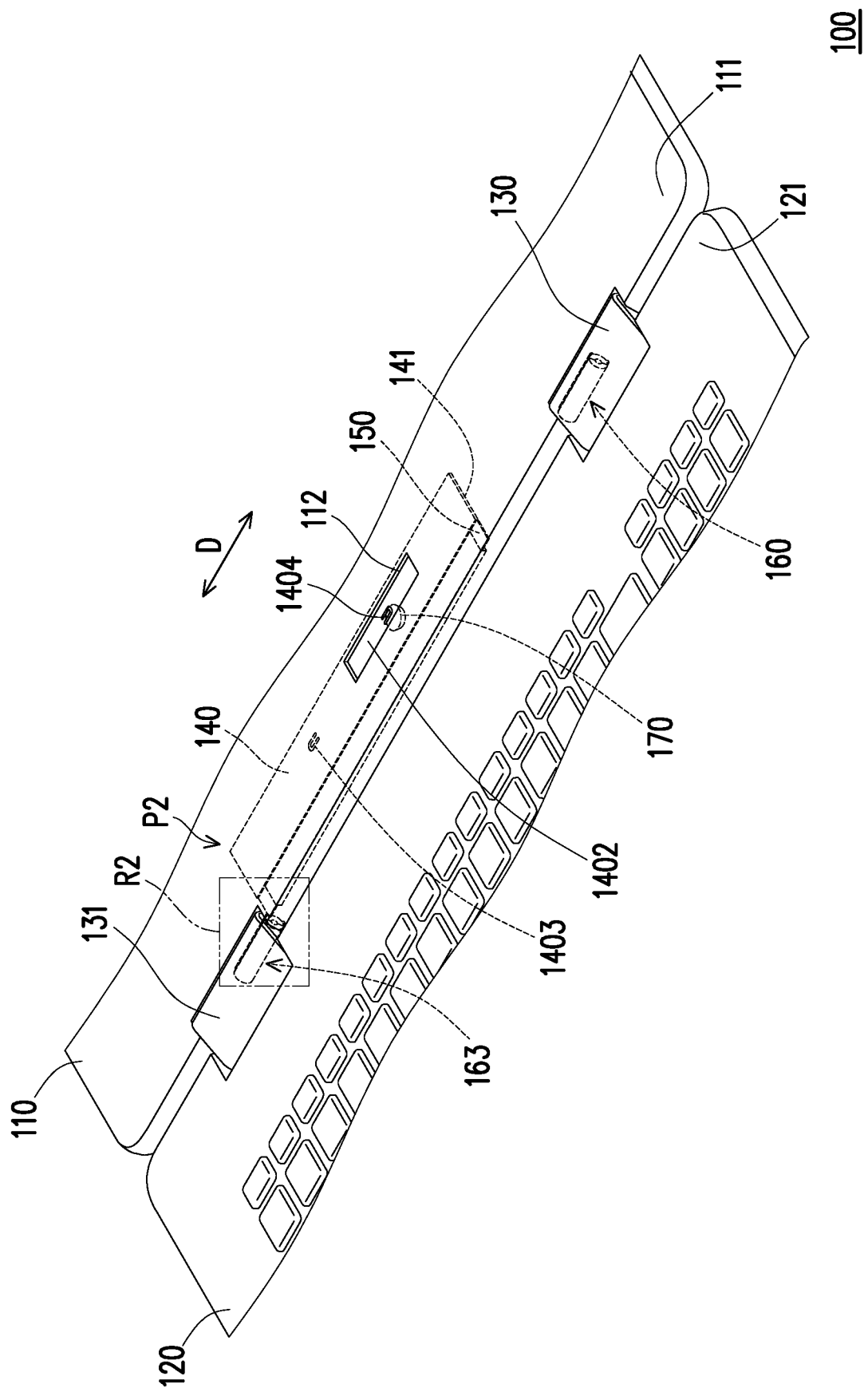
FIG. 2A is a schematic partial diagram illustrating the electronic device depicted in FIG. 1A after being switched to another state.
Figure 2B:
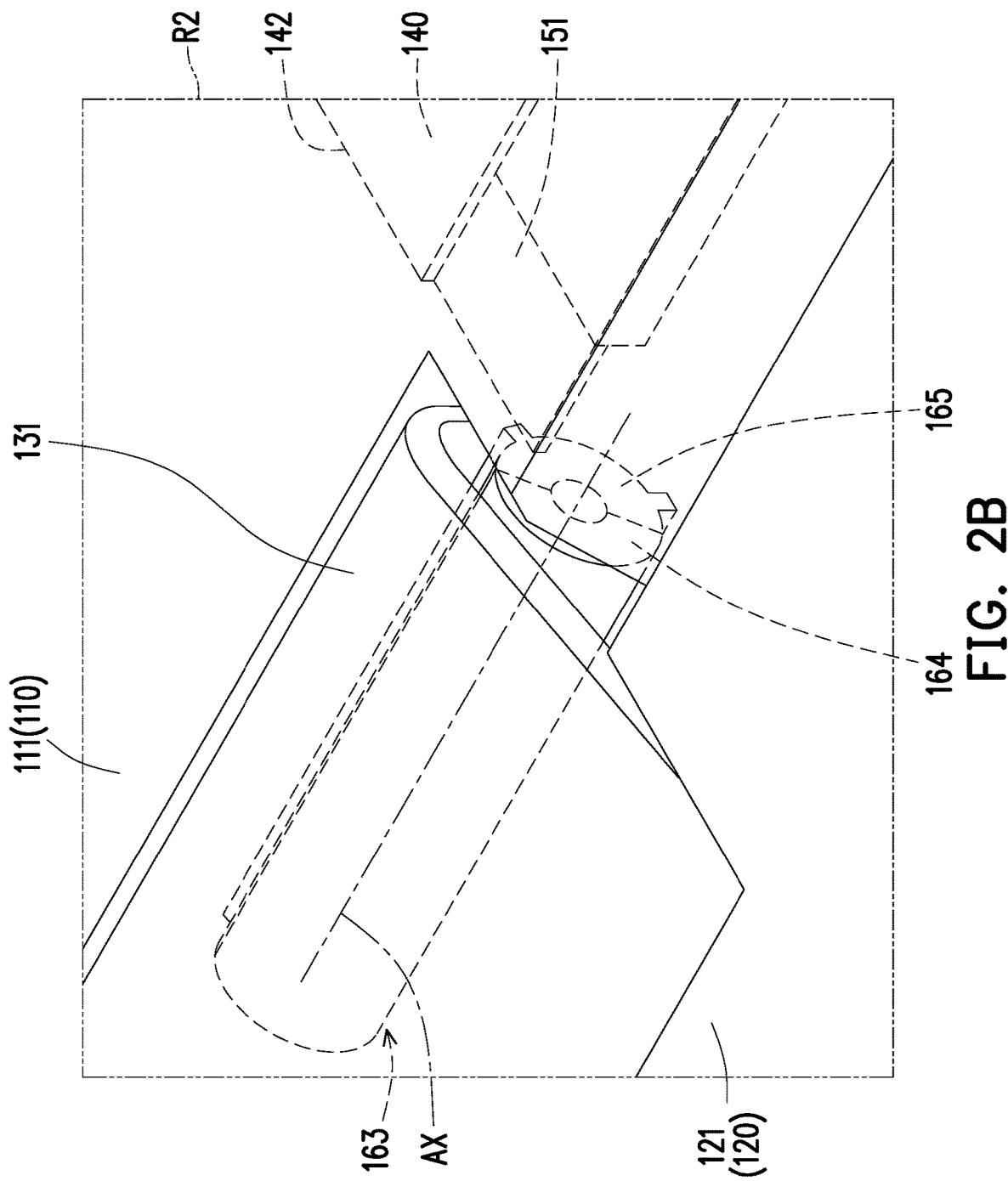
FIG. 2B is a schematic enlarged diagram illustrating a region R2 depicted in FIG. 2A.
Figure 2C:
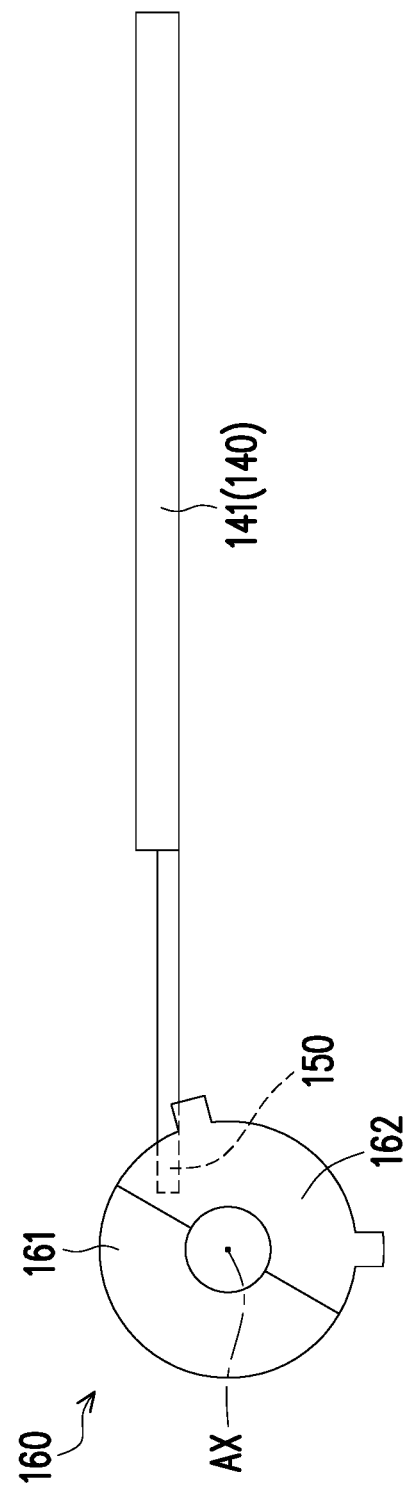
FIG. 2C is a schematic enlarged diagram illustrating the right side of the driven component, the third magnetic component and the fourth magnetic component depicted in FIG. 2A.

FIG. 1A is a schematic partial diagram illustrating an electronic device according to an embodiment of the disclosure. FIG. 1B is a schematic enlarged diagram illustrating a region R1 depicted in FIG. 1A. FIG. 1C is a schematic enlarged diagram illustrating the left side of a driven component, a third magnetic component and a fourth magnetic component depicted in FIG. 1A. FIG. 2A is a schematic partial diagram illustrating the electronic device depicted in FIG. 1A after being switched to another state. FIG. 2B is a schematic enlarged diagram illustrating a region R2 depicted in FIG. 2A. FIG. 2C is a schematic enlarged diagram illustrating the right side of the driven component, the third magnetic component and the fourth magnetic component depicted in FIG. 2A. Hereinafter, a notebook computer is taken as an example for description, but the disclosure is not limited thereto. Furthermore, a mechanism of positioning the driven component sought for protection by the disclosure may also be applied to a combination of a tablet computer, a smart cell phone, a combination of a tablet computer and a docking station or a combination of a smart cell phone and a docking station. In other words, the mechanism of positioning the driven component sought for protection by the disclosure may be applied to not only a product in which two bodies are pivoted to each other but also a product having a single body.

Referring to FIG. 1A and FIG. 1B first, in the present embodiment, an electronic device 100 includes a first body 110 and a second body 120, wherein the first body 110 may be a display, and the second body 120 may be a host. For example, the first body 110 and the second body 120 may be flipped or rotated relative to each other by 360 degrees, the first body 110 may be a display with a touch function, and thus, the operation may be more flexible.

On the other hand, the electronic device 100 further includes a first connection component 130 and a second connection component 131 arranged side by side, wherein the first body 110 has a first pivot side 111, the second body 120 has a second pivot side 121 adjacent to the first pivot side 111, and the first connection component 130 and the second connection component 131 are disposed between the first pivot side 111 and the second pivot side 121. The first pivot side 111 and the second pivot side 121 are respectively pivoted to the first connection component 130, and the first pivot side 111 and the second pivot side 121 are respectively pivoted to the second connection component 131. Furthermore, the first connection component 130 and the second connection component 131 may be hinge covers configured for accommodating a dual-shaft hinge structure. In other words, the first pivot side 111 and the second pivot side 121 are pivoted to the first connection component 130 through the dual-shaft hinge structure, and the first pivot side 111 and the second pivot side 121 are pivoted to the second connection component 131 through the dual-shaft hinge structure.

The electronic device 100 further includes a driven component 140, a first magnetic component 150 and a second magnetic component 160, wherein the driven component 140 is slidably disposed in the first body 110 and disposed adjacent to or close to the first pivot side 111. The driven component 140 is located between the first connection component 130 and the second connection component 131 and has a first side 141 facing the first connection component 130 and a second side 142 facing the second connection component 131. The first magnetic component 150 is disposed at the first side 141 of the driven component 140, and the second magnetic component 160 is fixed in the first connection component 130. Thus, during a process in which the first body 110 and the first connection component 130 are rotated relative to each other, the driven component 140 and the first magnetic component 150 thereon also rotate together with the first body 110 relative to the second magnetic component 160.

In the present embodiment, the first magnetic component 150 and the second magnetic component 160 are disposed corresponding to each other, wherein the first side 141 of the driven component 140 is close to the first connection component 130, and the first magnetic component 150 and the second magnetic component 160 are magnetically attracted to each other. Based on the magnetic attraction force between the first magnetic component 150 and the second magnetic component 160, the driven component 140 is positioned to be located at a first position P1 (referring to FIG. 1A). The second magnetic component 160 is, for example, a hollow cylinder, wherein an outer wall surface of the second magnetic component 160 and an inner wall surface of the first connection component 130 are respectively disposed with corresponding engagement structures to fix each other. On the other hand, the first body 110 is configured to be rotated relative to the first connection component 130 and the second magnetic component 160 fixed therein around an axis AX, and the axis AX, for example, extends to pass a center (i.e., a center of the hollow cylinder) of the second magnetic component 160. The second magnetic component 160 includes a first magnetic portion 161 and a second magnetic portion 162 which are different from each other in magnetism, wherein the first magnetic portion 161 and the second magnetic portion 162 may be two arc-shaped structures that are connected together and surround the axis AX to form the hollow cylinder. In other embodiments, the second magnetic component may be a solid cylinder, wherein the first magnetic portion and the second magnetic portion may be two sector-shaped structures that are connected together and surround the axis to form the solid cylinder.

As illustrated in FIG. 1B, the first magnetic component 150 is aligned to the first magnetic portion 161 in a direction parallel to the axis AX, and the first magnetic portion 161 has the magnetism which is different from that of the first magnetic component 150 to generate a magnetic attraction force to the first magnetic component 150, so as to position the driven component 140 at the first position P1 (referring to FIG. 1A). Referring to FIG. 1A to FIG. 2B, the driven component 140 is configured to slide back and forth along a sliding direction D between the first connection component 130 and the second connection component 131, or slide back and forth along the sliding direction D between the first position P1 (referring to FIG. 1A) and a second position P2 (referring to FIG. 2A), and the sliding direction D is parallel to the axis AX.

After the first body 110 is rotated relative to the first connection component 130 and the second magnetic component 160 fixed therein around the axis AX, for example, the first body 110 is switched from a state as illustrated in FIG. 1A to a state as illustrated in FIG. 2A, the driven component 140 slidably disposed in the first body 110 also rotates relative to the second magnetic component 160 around the axis AX, such that the first magnetic component 150 moves from a range in which the first magnetic portion 161 is located into a range in which the second magnetic portion 162 is located. As illustrated in FIG. 2C, the first magnetic component 150 is aligned to the second magnetic portion 162 in the direction parallel to the axis AX, the second magnetic portion 162 has the magnetism which is the same as that of the first magnetic component 150 to generate a magnetic repulsion force to the first magnetic component 150, so as to drive the driven component 140 to slide from the first position P1 (referring to FIG. 1A) to the second position P2 (referring to FIG. 2A).

The position at which the driven component 140 is located may be determined sufficiently by the switching between the magnetic attraction effect and the magnetic repulsion effect at single side. Namely, based on the relative rotation of the first body 110 and the second magnetic component 160 and a rotation angle corresponding thereto, the first magnetic component 150 moving synchronously together with the first body 110 may be aligned to different regions of the second magnetic component 160 in the direction parallel to the axis AX. When the first magnetic component 150 is aligned to the first magnetic portion 161 in the direction parallel to the axis AX, the first magnetic portion 161 generates the magnetic attraction force to the first magnetic component 150, so as to position the driven component 140 at the first position P1 (referring to FIG. 1A). On the contrary, when the first magnetic component 150 is aligned to the second magnetic portion 162 in the direction parallel to the axis AX, the second magnetic portion 162 generates the magnetic repulsion force to the first magnetic component 150, such that the driven component 140 is slid from the first position P1 (referring to FIG. 1A) to the second position P2 (referring to FIG. 2A).

Furthermore, a distribution range of the first magnetic portion 161 in the second magnetic component 160 and a distribution range of the second magnetic portion 162 in the second magnetic component 160 may be determined depending on a design demand. For example, in a case where the first body 110 and the second body 120 which are in a closed state are unfolded relative to each other, and before they are unfolded to a specific angle, the driven component 140 has to be positioned at the first position P1 (referring to FIG. 1A), and the distribution range of the first magnetic portion 161 in the second magnetic component 160 may be calculated according to this specific angle. That is to say, a start point and an end point of the distribution range of the first magnetic portion 161 may be determined in this way, and correspondingly, the distribution range of the second magnetic portion 162 in the second magnetic component 160 may be calculated.

In order to ensure that the driven component 140, after reaching the right position, is not slid due to an effect of an external force to improve reliability, the electronic device 100 of the present embodiment further includes a third magnetic component 151 and a fourth magnetic component 163, wherein the third magnetic component 151 is disposed at the second side 142 of the driven component 140, and the first magnetic component 150 is located between the second magnetic component 160 and the third magnetic component 151. On the other hand, the fourth magnetic component 163 is fixed in the second connection component 131. During the process of the first body 110 and the second connection component 131 being rotated relative to each other, the driven component 140 and the third magnetic component 151 thereon also rotate together with the first body 110 relative to the fourth magnetic component 163.

To be specific, the second magnetic component 160 and the fourth magnetic component 163 are symmetrically disposed at two opposite sides of the driven component 140, the fourth magnetic component 163 is aligned to the third magnetic component 151 in the direction parallel to the axis AX, and the third magnetic component 151 is located between the first magnetic component 150 and the fourth magnetic component 163. In the state as illustrated in FIG. 1A, the fourth magnetic component 163 generates a magnetic repulsion force to the third magnetic component 151 to ensure that the driven component 140 is positioned at the first position P1. Referring to FIG. 1A, FIG. 1C, FIG. 2A and FIG. 2B, the fourth magnetic component 163 is, for example, a hollow cylinder, wherein an outer wall surface of the fourth magnetic component 163 and an inner wall surface of the second connection component 131 are respectively disposed with corresponding engagement structures to fix each other. On the other hand, the first body 110 is configured to be rotated relative to the second connection component 131 and the fourth magnetic component 163 fixed therein around the axis AX, and the axis AX, for example, extends to pass a center (i.e., a center of the hollow cylinder) of the fourth magnetic component 163. The fourth magnetic component 163 includes a third magnetic portion 164 and a fourth magnetic portion 165 which are different from each other in magnetism, wherein the third magnetic portion 164 and the fourth magnetic portion 165 may be two arc-shaped structures that are connected together and surround the axis AX to form the hollow cylinder. In other embodiments, the fourth magnetic component may be a solid cylinder, wherein the third magnetic portion and the fourth magnetic portion may be two sector-shaped structures that are connected together and surround the axis to form the solid cylinder.

As illustrated in FIG. 1C, the third magnetic component 151 is aligned to the third magnetic portion 164 in the direction parallel to the axis AX, and the third magnetic portion 164 has the magnetism which is the same as that of the third magnetic component 151 to generate a magnetic repulsion force to the third magnetic component 151, so as to ensure that the driven component 140 is positioned at the first position P1 (referring to FIG. 1A). To be specific, because the second magnetic component 160 and the fourth magnetic component 163 are symmetrically disposed at the two opposite sides of the driven component 140, the first magnetic portion 161 and the third magnetic portion 164 are aligned to each other and overlap with each other in the direction parallel to the axis AX, and the second magnetic portion 162 and the fourth magnetic portion 165 are aligned to each other and overlap with each other in the direction parallel to the axis AX, as illustrated in FIG. 1B, FIG. 1C, FIG. 2B and FIG. 2C.

After the first body 110 is rotated relative to the second connection component 131 and the fourth magnetic component 163 fixed therein the axis AX, for example, the first body 110 is switched from the state as illustrated in FIG. 1A to the state as illustrated in FIG. 2A. During the switching process, the driven component 140 slidably disposed in the first body 110 also rotates relative to the fourth magnetic component 163 around the axis AX. Referring to FIG. 1B, FIG. 1C, FIG. 2B and FIG. 2C, while the first magnetic component 150 moves from the range in which the first magnetic portion 161 is located into the range in which the second magnetic portion 162 is located, the third magnetic component 151 moves from a range in which the third magnetic portion 164 is located into a range in which the fourth magnetic portion 165 is located. In this circumstance, the third magnetic component 151 is aligned to the fourth magnetic portion 165 in the direction parallel to the axis AX, and the fourth magnetic portion 165 has the magnetism which is different from that of the third magnetic component 151 to generate the magnetic attraction force to the third magnetic component 151, so as to ensure that the driven component 140 is positioned at the second position P2 (referring to FIG. 2A).

In addition, during a process of the first body 110 and the second body 120 returning the closed state, the corporation of the third magnetic component 151 and the fourth magnetic component 163 may also contribute to driving the driven component 140 to return to the original position.

Referring to FIG. 1A and FIG. 2A, in the present embodiment, the first body 110 has an opening region 112 configured for exposing a part of the driven component 140. For example, when the driven component 140 is positioned at the first position P1, a first block 1401 of the driven component 140 is exposed out of the opening region 112, and the first block 1401 has a specific pattern or text. In this circumstance, a first person operating the electronic device 100 views that the specific pattern or text in the obtained first block 1401 is a forward pattern or font. On the contrary, when the driven component 140 is positioned at the second position P2, a second block 1402 of the driven component 140 is exposed out of the opening region 112, and the second block 1402 may be designed with a specific pattern or text. In this circumstance, a person who operates the electronic device 100 views that the specific pattern or text in the obtained second block 1402 is a reverse pattern or font, and a second person who is located opposite to the first person views that the specific pattern or text in the obtained second block 1402 is a forward pattern or font. Furthermore, the specific pattern or text in the first block 1401 may be the same as the specific pattern or text in the second block 1402, however, the specific pattern or text in the second block 1402 may be obtained by, for example, rotating the specific pattern or text in the first block 1401 by 180 degrees.

That is to say, the magnetic attraction force and the magnetic repulsion force applied to the driven component 140 may be switched through the relative rotation of the first body 110 and the second body 120, such that the driven component 140 may be capable of being positioned at at least two positions, and at least two blocks of the driven component 140 are exposed out of the opening region 112. Thereby, through pattern or text designs in different blocks, people located around the electronic device 100 may have different visual experiences. Thus, the electronic device 100 of the present embodiment may be not only changed flexibly, but also improved in product identification.

In the present embodiment, the specific pattern or text in the first block 1401 may be presented in a hollowed design manner, thereby forming a first hollow portion 1403. Similarly, the specific pattern or text in the second block 1402 may be presented in a hollowed design manner, thereby forming a second hollow portion 1404. To be specific, the first hollow portion 1403 and the second hollow portion 1404 are arranged side by side, and when the driven component 140 is positioned at the first position P1, the first hollow portion 1403 is exposed out of the opening region 112, and the second hollow portion 1404 is hidden in the first body 110. On the contrary, when the driven component 140 is positioned at the second position P2, the second hollow portion 1404 is exposed out of the opening region 112, and the first hollow portion 1403 is hidden in the first body 110. On the other hand, a light source 170 is disposed in the first body 110 and is aligned to the opening region 112. Thus, when the driven component 140 is positioned at the first position P1, the light source 170 is aligned to the first hollow portion 1403, such that light emitted from the light source 170 is projected out through the first hollow portion 1403 and the opening region 112. On the contrary, when the driven component 140 is positioned at the second position P2, the light source 170 is aligned to the second hollow portion 1404, such that the light emitted from the light source 170 is projected out through the second hollow portion 1404 and the opening region 112.

Other embodiments are provided below, and the description is set forth with respect to the difference among each of embodiments. Same or similar structural configurations, operations principles and technical effects in each of the embodiments will not be repeatedly described.

Figure 3A:
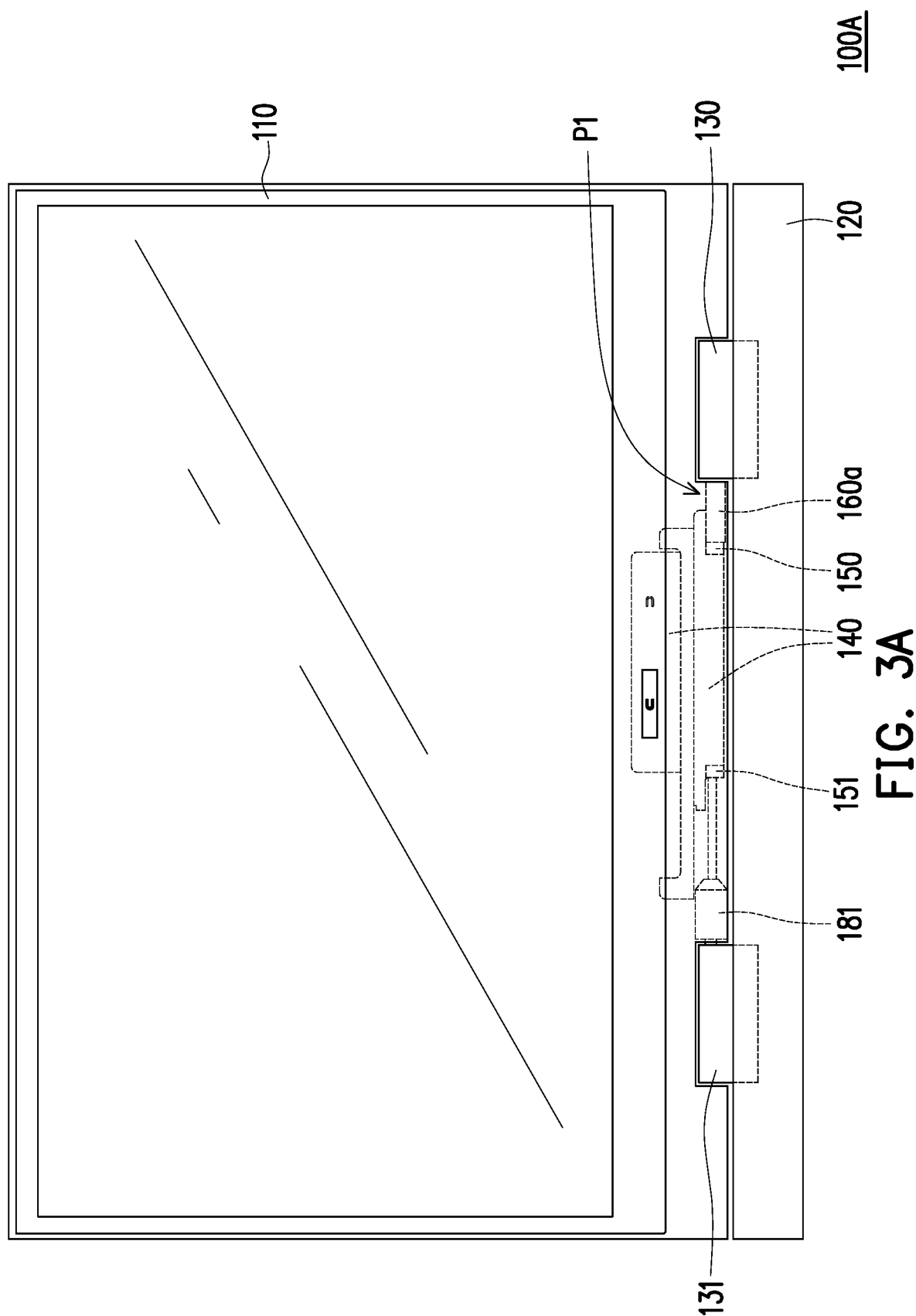
FIG. 3A is a schematic diagram illustrating an electronic device according to another embodiment of the disclosure.
Figure 3B:
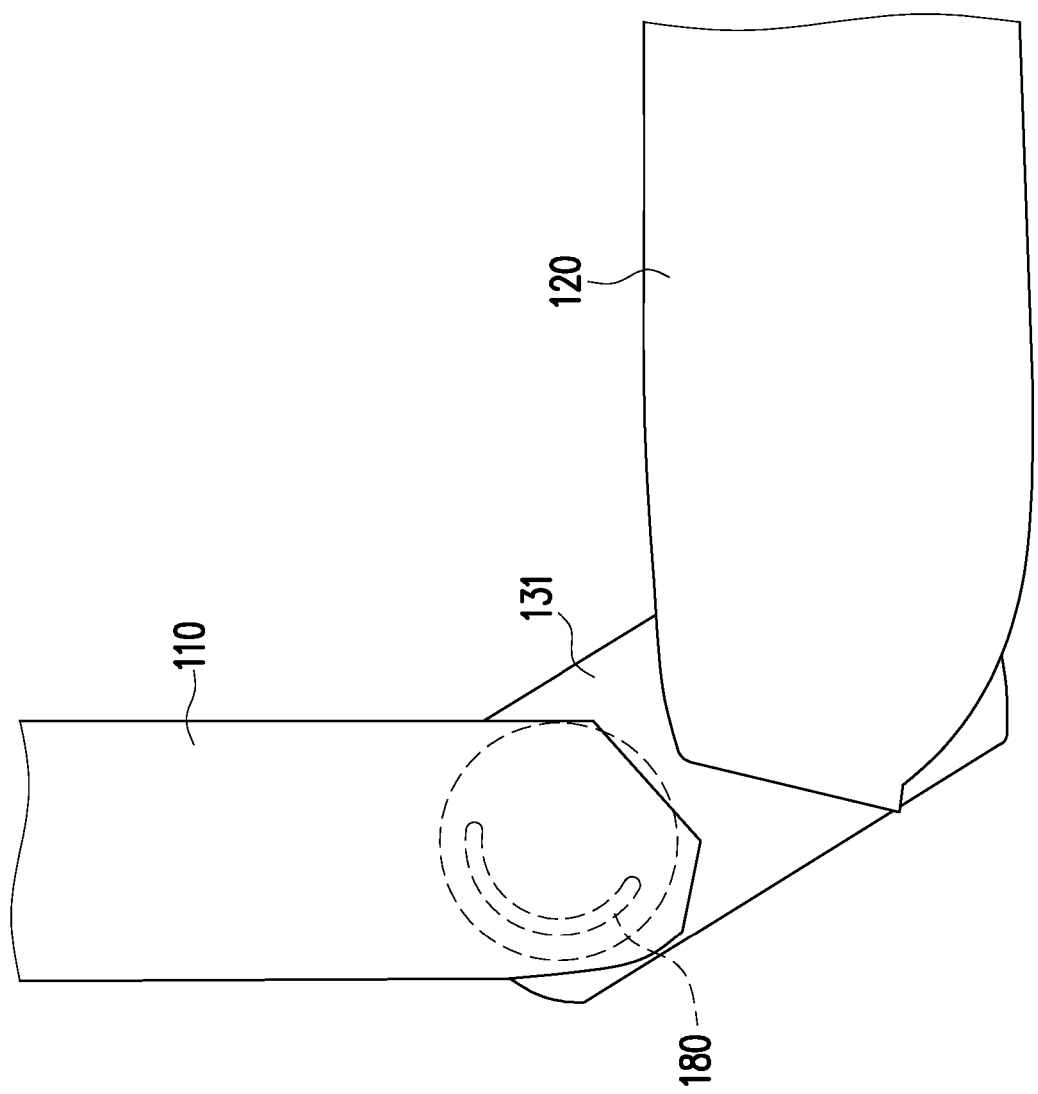
FIG. 3B is a schematic partial enlarged diagram illustrating the left side of the electronic device depicted in FIG. 3A.
Figure 3C:
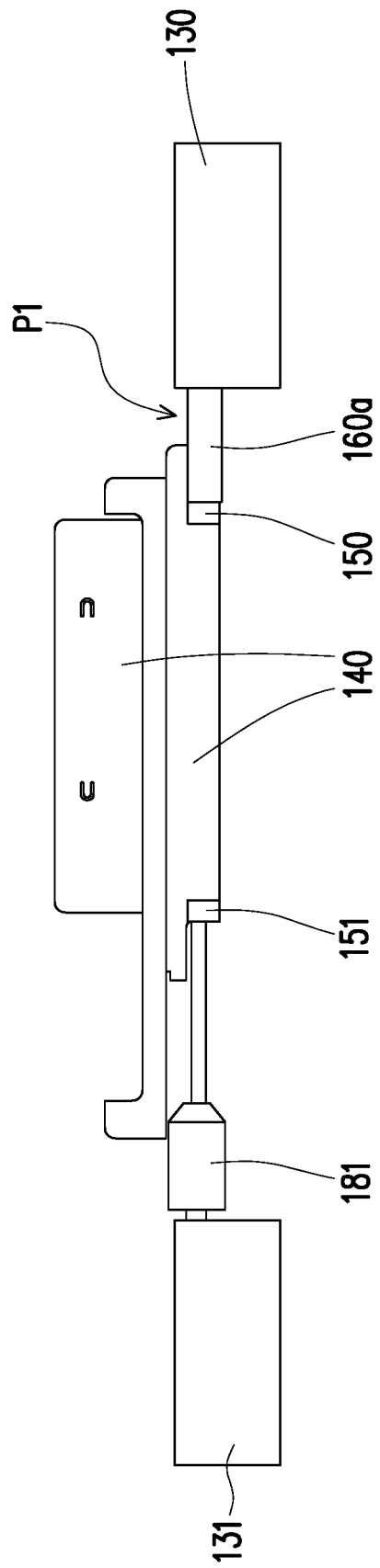
FIG. 3C is a schematic diagram illustrating a configuration relationship among the first connection component, the second connection component, the driven component, the first magnetic component, the second magnetic component, the third magnetic component and the electromagnetic component depicted in FIG. 3A.
Figure 3D:
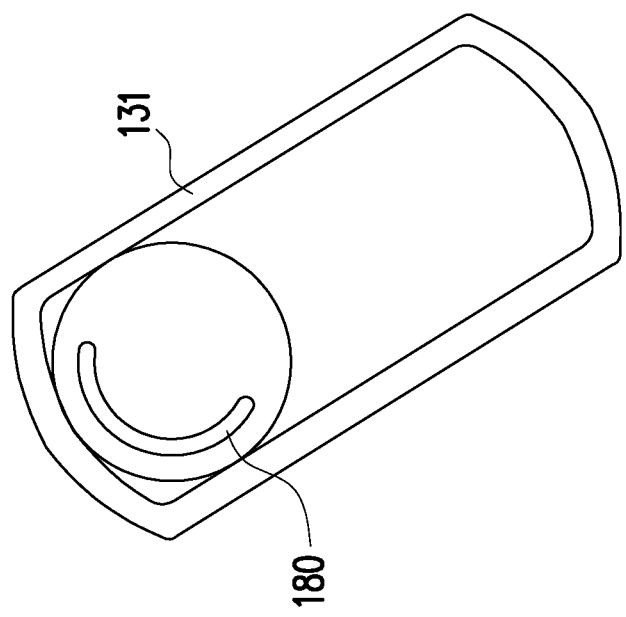
FIG. 3D is a schematic diagram illustrating the second connection component depicted in FIG. 3B and a conductive sheet installed therein.
Figure 4A:
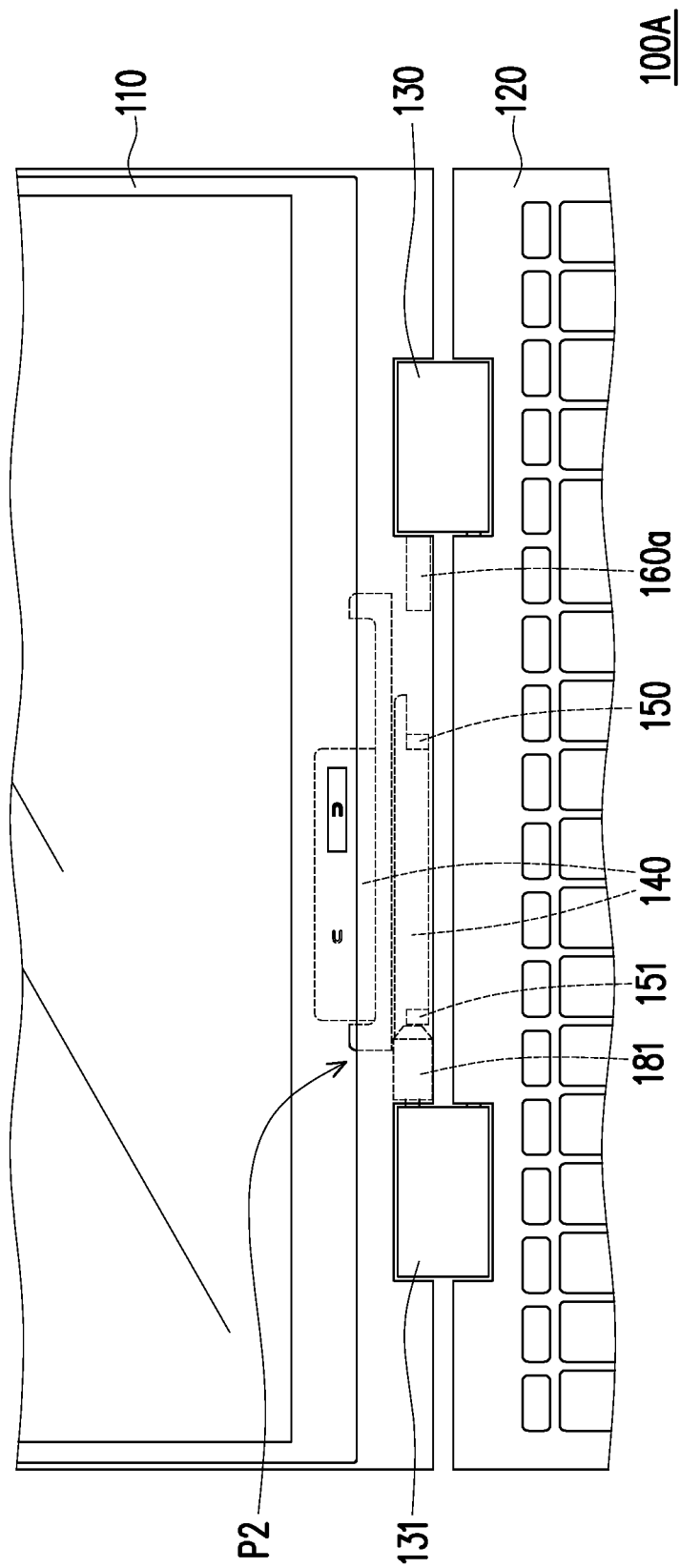
FIG. 4A is a schematic partial diagram illustrating the electronic device depicted in FIG. 3A after being switched to another state.
Figure 4B:
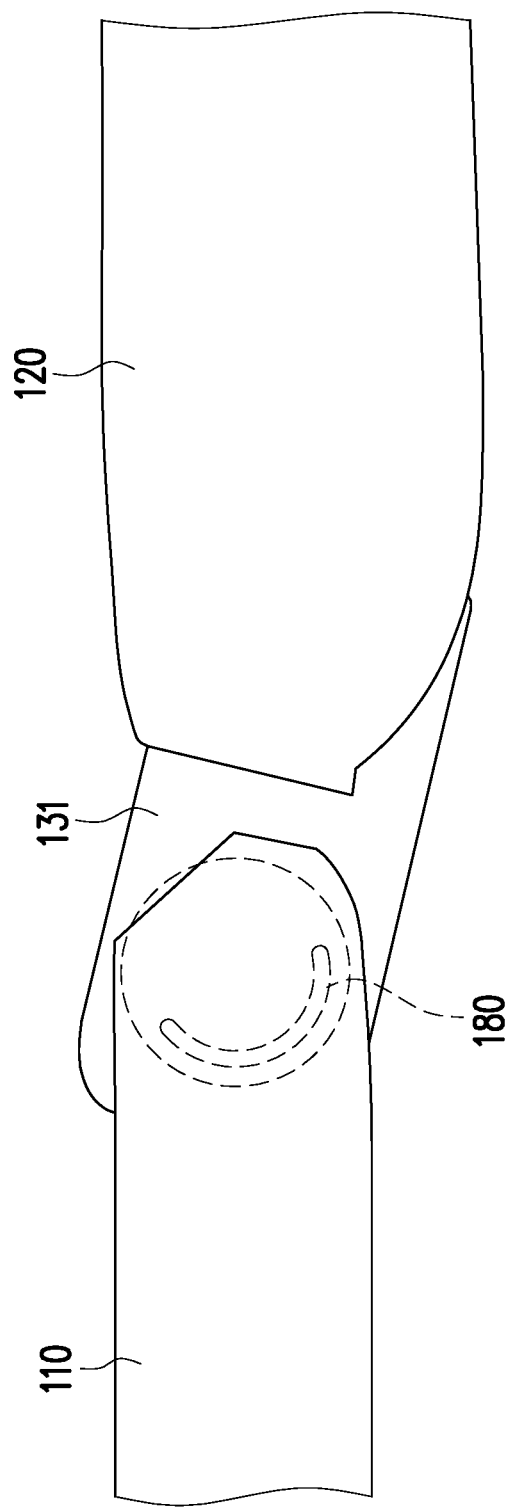
FIG. 4B is a schematic partial enlarged diagram illustrating the left side of the electronic device depicted in FIG. 4A.

FIG. 3A is a schematic diagram illustrating an electronic device according to another embodiment of the disclosure. FIG. 3B is a schematic partial enlarged diagram illustrating the left side of the electronic device depicted in FIG. 3A. FIG. 3C is a schematic diagram illustrating a configuration relationship among the first connection component, the second connection component, the driven component, the first magnetic component, the second magnetic component, the third magnetic component and the electromagnetic component depicted in FIG. 3A. FIG. 3D is a schematic diagram illustrating the second connection component depicted in FIG. 3B and a conductive sheet installed therein. FIG. 4A is a schematic partial diagram illustrating the electronic device depicted in FIG. 3A after being switched to another state. FIG. 4B is a schematic partial enlarged diagram illustrating the left side of the electronic device depicted in FIG. 4A.

Figure 4C:
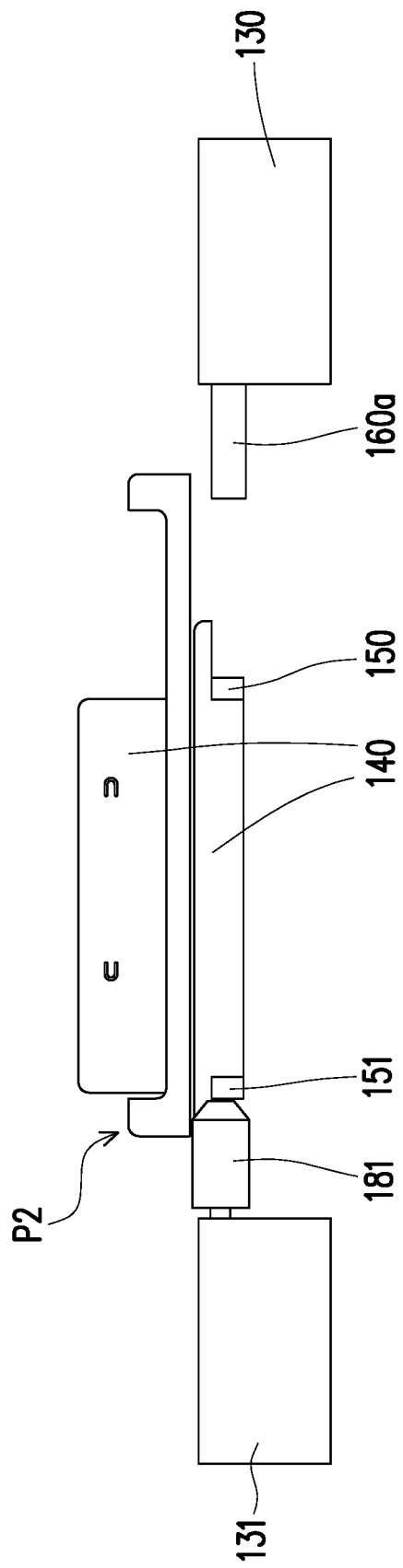
FIG. 4C is a schematic diagram illustrating a configuration relationship among the first connection component, the second connection component, the driven component, the first magnetic component, the second magnetic component, the third magnetic component and the electromagnetic component depicted in FIG. 4A.
Figure 4D:
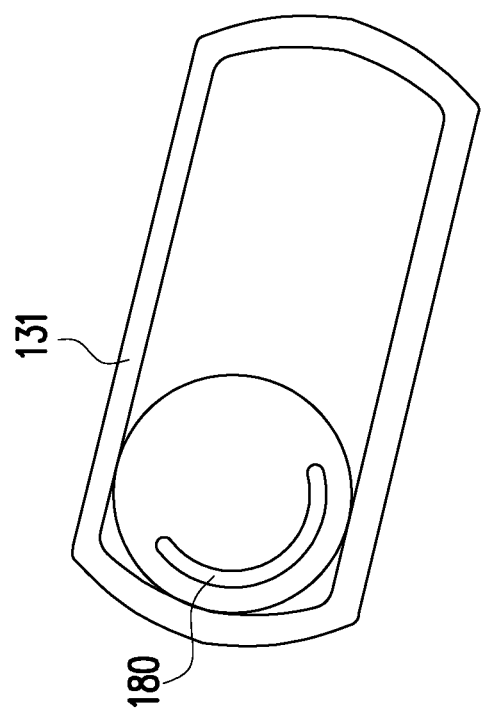
FIG. 4D is a schematic diagram illustrating the second connection component depicted in FIG. 4B and the conductive sheet installed therein.

FIG. 4C is a schematic diagram illustrating a configuration relationship among the first connection component, the second connection component, the driven component, the first magnetic component, the second magnetic component, the third magnetic component and the electromagnetic component depicted in FIG. 4A. FIG. 4D is a schematic diagram illustrating the second connection component depicted in FIG. 4B and the conductive sheet installed therein. Referring to FIG. 3A to FIG. 3D, in the present embodiment, a second magnetic component 160a of an electronic device 100A is disposed in a first body 110, wherein a position at which the second magnetic component 160a is located is close to a first connection component 130 and is located between the driven component 140 and the first connection component 130. For example, the second magnetic component 160a is configured to generate a magnetic attraction force to the first magnetic component 150, so as to position the driven component 140 at the first position P1.

On the other hand, the electronic device 100A further includes a conductive sheet 180 and an electromagnetic component 181, wherein the conductive sheet 180 is fixed in the second connection component 131, and the electromagnetic component 181 is disposed in the first body 110. The first body 110 and the electromagnetic component 181 are rotatably connected to the conductive sheet 180, wherein the third magnetic component 151 and the electromagnetic component 181 are disposed corresponding to each other, and the electromagnetic component 181 is located between the third magnetic component 151 and the conductive sheet 180. The conductive sheet 180 may be an arc-shaped conductive sheet, and during the process of the first body 110 and the second connection component 131 being rotated relative to each other, the electromagnetic component 181, the driven component 140 and third magnetic component 151 on the driven component 140 also rotate relative to the conductive sheet 180 together with the first body 110. For example, in a case where the first body 110 and the second body 120 which are in the closed state are unfolded relative to each other, and before they are unfolded to a specific angle, the driven component 140 has to be positioned at the first position P1 (referring to FIG. 3A and FIG. 3C), and a distribution range of the conductive sheet 180 may be calculated according to this specific angle. That is to say a start point and an end point of the distribution range of the conductive sheet 180 may be determined in this way.

That is to say, in a case where the first body 110 and the second body 120 which are in the closed state are unfolded relative to each other, and before the first body 110 and the second body 120 are unfolded to a specific angle, the conductive sheet 180 is not conducted with the electromagnetic component 181. In this circumstance, the magnetic attraction force generated to the first magnetic component 150 by the second magnetic component 160a is capable of ensuring that the driven component 140 is positioned at the first position P1 (referring to FIG. 3A and FIG. 3C). Referring to FIG. 3A to FIG. 4D, after the first body 110 and the second body 120 are unfolded relative to each other to the specific angle, the conductive sheet 180 is conducted with the electromagnetic component 181, such that the electromagnetic component 181 is powered on to generate a magnetic attraction force to the third magnetic component 151, and the magnetic attraction force may get over and suppress the magnetic attraction force generated to the first magnetic component 150 by the second magnetic component 160a, such that the driven component 140 may be driven by the magnetic attraction force generated by the electromagnetic component 181 to move to the second position P2 (referring to FIG. 4A and FIG. 4C). In a condition that the conductive sheet 180 and the electromagnetic component 181 are conducted with each other to keep powering on the electromagnetic component 181, the driven component 140 may be positioned at the second position P2 (referring to FIG. 4A and FIG. 4C).

In light of the foregoing, the electronic device of one of the embodiments of the disclosure can switch the magnetic attraction force and the magnetic repulsion force applied to the driven component through the relative rotation of the first body and the second body, such that the driven component can be positioned at at least two different positions, and at least two different blocks of the driven component can be exposed out of the opening region. Thereby, people located around the electronic device can have different visual experiences through the pattern or text designs in different blocks. Thus, the electronic device of the disclosure can be not only changed flexibly but also improved in the product identification. The electronic device of another one of the embodiments of the disclosure can close the magnetic attraction force off by not powering on the electromagnetic component or can generate the magnetic attraction force by powering on the electromagnetic component through the relative rotation of the first body and the second. In the condition that the electromagnetic component is not powered on and does not generate the magnetic attraction force, the driven component is positioned at the original position, and in the condition that the electromagnetic component is powered on and generates the magnetic attraction force, the driven component is driven by the magnetic attraction force and moves toward the electromagnetic component.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. An electronic device, comprising:
   a body;
   a driven component, slidably disposed in the body;
   a first magnetic component, disposed at the driven component; and
   a second magnetic component, located at one side of the driven component, the first magnetic component and the second magnetic component being disposed corresponding to each other, and the second magnetic component being configured to generate a magnetic attraction force or a magnetic repulsion force to the first magnetic component, so as to position the driven component based on the magnetic attraction force or the magnetic repulsion force between the first magnetic component and the second magnetic component.

2. The electronic device according to claim 1, wherein the body is rotatably connected to the second magnetic component, and the second magnetic component comprises a first magnetic portion and a second magnetic portion which are different from each other in magnetism, and along with relative rotation of the body and the second magnetic component, the first magnetic component is aligned to the first magnetic portion or the second magnetic portion.

3. The electronic device according to claim 2, wherein the magnetism of one of the first magnetic portion and the second magnetic portion is different from magnetism of the first magnetic component, and the magnetism of the other one of the first magnetic portion and the second magnetic portion is the same as the magnetism of the first magnetic component.

4. The electronic device according to claim 2, further comprising:
   a third magnetic component, disposed at the driven component, wherein the first magnetic component and the third magnetic component are respectively located at two opposite sides of the driven component, and the first magnetic component is located between the second magnetic component and the third magnetic component; and
   a fourth magnetic component, the body being rotatably connected to the fourth magnetic component, wherein the third magnetic component and the fourth magnetic component are disposed corresponding to each other, the third magnetic component is located between the first magnetic component and the fourth magnetic component, and the fourth magnetic component is configured to generate a magnetic attraction force or a magnetic repulsion force to the third magnetic component, so as to position the driven component based on the magnetic attraction force or the magnetic repulsion force between the third magnetic component and the fourth magnetic component, wherein
   when the second magnetic component generates the magnetic attraction force to the first magnetic component, the fourth magnetic component generates the magnetic repulsion force to the third magnetic component, and when the second magnetic component generates the magnetic repulsion force to the first magnetic component, the fourth magnetic component generates the magnetic attraction force to the third magnetic component.

5. The electronic device according to claim 4, wherein the fourth magnetic component comprises a third magnetic portion and a fourth magnetic portion which are different from each other in magnetism, and along with relative rotation of the body and the fourth magnetic component, the third magnetic component is aligned to the third magnetic portion or the fourth magnetic portion.

6. The electronic device according to claim 5, wherein the magnetism of one of the third magnetic portion and the fourth magnetic portion is different from magnetism of the third magnetic component, and the magnetism of the other one of the third magnetic portion and the fourth magnetic portion is the same as the magnetism of the third magnetic component.

7. The electronic device according to claim 5, wherein the first magnetic portion and the third magnetic portion are aligned to each other, and the second magnetic portion and the fourth magnetic portion are aligned to each other.

8. The electronic device according to claim 1, further comprising:
   a light source, disposed in the body, wherein the driven component has a first hollow portion and a second hollow portion arranged side by side, and along with the driven component being slid relative to the body, any one of the first hollow portion and the second hollow portion is aligned to the light source.

9. The electronic device according to claim 1, wherein the second magnetic component is disposed in the body and generates the magnetic attraction force to the first magnetic component, and the electronic device further comprises:
   a third magnetic component, disposed at the driven component, wherein the first magnetic component and the third magnetic component are respectively located at two opposite sides of the driven component, and the first magnetic component is located between the second magnetic component and the third magnetic component;
   a conductive sheet; and
   an electromagnetic component, disposed in the body, and the body and the electromagnetic component being rotatably connected to the conductive sheet, wherein the third magnetic component and the electromagnetic component are disposed corresponding to each other, the electromagnetic component is located between the third magnetic component and the conductive sheet, and the conductive sheet is configured to be conducted with the electromagnetic component to induce the electromagnetic component to generate a magnetic attraction force to the third magnetic component, so as to get over and suppress the magnetic attraction force generated to the first magnetic component by the second magnetic component based on the magnetic attraction force between the third magnetic component and the electromagnetic component.

10. The electronic device according to claim 1, wherein the body has an opening region for exposing a part of the driven component.

11. An electronic device, comprising:
    a first body;
    a second body;
    a first connection component, the first body and the second body being respectively pivoted to the first connection component;
    a driven component, slidably disposed in the first body;
    a first magnetic component, disposed at the driven component; and
    a second magnetic component, disposed corresponding to the first connection component, wherein the second magnetic component is located at one side of the driven component, the first magnetic component and the second magnetic component are disposed corresponding to each other, and the second magnetic component is configured to generate a magnetic attraction force or a magnetic repulsion force to the first magnetic component, so as to position the driven component based on the magnetic attraction force or the magnetic repulsion force between the first magnetic component and the second magnetic component.

12. The electronic device according to claim 11, wherein the second magnetic component is fixed in the first connection component, the first body is rotatably connected to the second magnetic component, the second magnetic component comprises a first magnetic portion and a second magnetic portion which are different from each other in magnetism, and along with relative rotation of the first body and the second magnetic component, the first magnetic component is aligned to the first magnetic portion or the second magnetic portion.

13. The electronic device according to claim 12, wherein the magnetism of one of the first magnetic portion and the second magnetic portion is different from magnetism of the first magnetic component, and the magnetism of the other one of the first magnetic portion and the second magnetic portion is the same as the magnetism of the first magnetic component.

14. The electronic device according to claim 12, further comprising:
    a second connection component, arranged side by side with the first connection component, wherein the first body and the second body are respectively pivoted to the second connection component, and the driven component is located between the first connection component and the second connection component;
a third magnetic component, disposed at the driven component, wherein the first magnetic component and the third magnetic component are respectively located at two opposite sides of the driven component, and the first magnetic component is located between the second magnetic component and the third magnetic component; and
a fourth magnetic component, fixed in the second connection component, wherein the first body is rotatably connected to the fourth magnetic component, the third magnetic component and the fourth magnetic component are disposed corresponding to each other, the third magnetic component is located between the first magnetic component and the fourth magnetic component, and the fourth magnetic component is configured to generate a magnetic attraction force or a magnetic repulsion force to the third magnetic component, so as to position the driven component based on the magnetic attraction force or the magnetic repulsion force between the third magnetic component and the fourth magnetic component, wherein
when the second magnetic component generates the magnetic attraction force to the first magnetic component, the fourth magnetic component generates the magnetic repulsion force to the third magnetic component, and when the second magnetic component generates the magnetic repulsion force to the first magnetic component, the fourth magnetic component generates the magnetic attraction force to the third magnetic component.

15. The electronic device according to claim 14, wherein the fourth magnetic component comprises a third magnetic portion and a fourth magnetic portion which are different from each other in magnetism, and along with relative rotation of the first body and the fourth magnetic component, the third magnetic component is aligned to the third magnetic portion or the fourth magnetic portion.

16. The electronic device according to claim 15, the magnetism of one of the third magnetic portion and the fourth magnetic portion is different from magnetism of the third magnetic component, and the magnetism of the other one of the third magnetic portion and the fourth magnetic portion is the same as the magnetism of the third magnetic component.

17. The electronic device according to claim 15, wherein the first magnetic portion and the third magnetic portion are aligned to each other, and the second magnetic portion and the fourth magnetic portion are aligned to each other.

18. The electronic device according to claim 11, further comprising:
a light source, disposed in the body, wherein the driven component has a first hollow portion and a second hollow portion arranged side by side, and along with the driven component being slid relative to the first body, any one of the first hollow portion and the second hollow portion is aligned to the light source.

19. The electronic device according to claim 11, wherein the second magnetic component is disposed in the first body and generates the magnetic attraction force to the first magnetic component, and the electronic device further comprises:
a second connection component, arranged side by side with the first connection component, wherein the first body and the second body are respectively pivoted to the second connection component, and the driven component is located between the first connection component and the second connection component;
a third magnetic component, disposed at the driven component, the first magnetic component and the third magnetic component being respectively located at two opposite sides of the driven component, and the first magnetic component being located between the second magnetic component and the third magnetic component;
a conductive sheet, fixed in the second connection component;
an electromagnetic component, disposed in the first body, and the first body and the electromagnetic component being rotatably connected to the conductive sheet, wherein the third magnetic component and the electromagnetic component are disposed corresponding to each other, the electromagnetic component is located between the third magnetic component and the conductive sheet, and the conductive sheet is configured to be conducted with the electromagnetic component to induce the electromagnetic component to generate a magnetic attraction force to the third magnetic component, so as to get over and suppress the magnetic attraction force generated to the first magnetic component by the second magnetic component based on the magnetic attraction force between the third magnetic component and the electromagnetic component.

20. The electronic device according to claim 11, wherein the body has an opening region for exposing a part of the driven component.

* * * * *